United States Patent
Wunderlich et al.

(10) Patent No.: US 10,410,319 B2
(45) Date of Patent: Sep. 10, 2019

(54) METHOD AND SYSTEM FOR OPERATING A TOUCH-SENSITIVE DISPLAY DEVICE OF A MOTOR VEHICLE

(71) Applicant: AUDI AG, Ingolstadt (DE)

(72) Inventors: Matthias Wunderlich, Ingolstadt (DE); Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 63 days.

(21) Appl. No.: 15/523,376

(22) PCT Filed: Oct. 27, 2015

(86) PCT No.: PCT/EP2015/002123
§ 371 (c)(1),
(2) Date: Apr. 29, 2017

(87) PCT Pub. No.: WO2016/066258
PCT Pub. Date: May 6, 2016

(65) Prior Publication Data
US 2017/0249718 A1    Aug. 31, 2017

(30) Foreign Application Priority Data
Oct. 31, 2014   (DE) ......................... 10 2014 016 222

(51) Int. Cl.
*G06F 3/0488*   (2013.01)
*B60K 37/02*    (2006.01)
(Continued)

(52) U.S. Cl.
CPC ................ *G06T 3/20* (2013.01); *B60K 35/00* (2013.01); *B60K 37/06* (2013.01); *B60R 1/00* (2013.01);
(Continued)

(58) Field of Classification Search
CPC .. G06T 3/20; G06K 9/00362; G06K 9/00013; G06K 9/00838; B60R 1/00;
(Continued)

(56) References Cited

U.S. PATENT DOCUMENTS

| 2003/0023352 A1 | 1/2003 | Ogino et al. |
| 2004/0129007 A1 * | 7/2004 | Tomita ............... B60H 1/00064 62/157 |

(Continued)

FOREIGN PATENT DOCUMENTS

| CN | 103221784 A | 7/2010 |
| CN | 102239465 A | 11/2011 |

(Continued)

OTHER PUBLICATIONS

International Search Report for PCT/EP2015/002123 dated Jul. 3, 2016.

(Continued)

*Primary Examiner* — Ibrahim A Khan
(74) *Attorney, Agent, or Firm* — Staas & Halsey LLP (57) ABSTRACT

A determination is made as to whether a driver or a front-seat passenger of the motor vehicle would like to operate a display device. If it is detected that only the driver would like to operate the display device, the display device is put in a first operating mode in which a graphic user interface is displayed exclusively in a driver-side display region of the display device. If it is detected that only the front-seat passenger of the motor vehicle would like to operate the display device, the display device is put in a second operating mode in which the graphic user interface is displayed exclusively in a front-seat-passenger-side display region of the display device. If it is detected that the driver and the front-seat passenger of the motor vehicle both would like to operate the display device, the display device is put in a third (Continued)

operating mode in which the graphic user interface is displayed in the driver-side display region and at least part of the graphic user interface is additionally also displayed in the front-seat-passenger-side display region.

21 Claims, 3 Drawing Sheets

(51) Int. Cl.
    *G06T 3/20*     (2006.01)
    *B60W 50/10*     (2012.01)
    *B60K 35/00*     (2006.01)
    *B60K 37/06*     (2006.01)
    *G06F 3/041*     (2006.01)
    *B60R 1/00*     (2006.01)
    *G06K 9/00*     (2006.01)

(52) U.S. Cl.
    CPC ........... *B60W 50/10* (2013.01); *G06F 3/0416* (2013.01); *G06F 3/0488* (2013.01); *G06F 3/04883* (2013.01); *G06F 3/04886* (2013.01); *G06K 9/00013* (2013.01); *G06K 9/00362* (2013.01); *G06K 9/00838* (2013.01); *B60K 2370/11* (2019.05); *B60K 2370/122* (2019.05); *B60K 2370/141* (2019.05); *B60K 2370/146* (2019.05); *B60K 2370/1438* (2019.05); *B60K 2370/1442* (2019.05); *B60K 2370/197* (2019.05); *B60K 2370/199* (2019.05); *B60K 2370/21* (2019.05); *B60K 2370/48* (2019.05); *B60K 2370/52* (2019.05); *B60K 2370/73* (2019.05); *B60K 2370/736* (2019.05); *B60K 2370/739* (2019.05); *B60K 2370/741* (2019.05); *B60R 2300/207* (2013.01); *G06F 2203/04808* (2013.01)

(58) Field of Classification Search
    CPC ............. B60R 2300/207; G06F 3/0488; G06F 3/0416; G06F 3/04886; G06F 3/04883; G06F 2203/04808; B60W 50/10; B60K 35/00; B60K 37/06; B60K 2350/1028; B60K 2350/352; B60K 2350/2013; B60K 2350/1052; B60K 2350/1032; B60K 2350/1016; B60K 2350/1012; B60K 2350/1004; B60K 2350/901; B60K 2350/903

See application file for complete search history.

(56) References Cited

U.S. PATENT DOCUMENTS

| | | | | |
|---|---|---|---|---|
| 2005/0280524 A1* | 12/2005 | Boone | .................... | B60K 35/00 340/461 |
| 2006/0066507 A1* | 3/2006 | Yanagisawa | ........... | B60K 35/00 345/7 |
| 2007/0129864 A1* | 6/2007 | Tanaka | .................... | B60K 35/00 701/36 |
| 2007/0171193 A1* | 7/2007 | Nakamura | ............. | B60K 35/00 345/156 |
| 2007/0297064 A1* | 12/2007 | Watanabe | .............. | B60K 35/00 359/630 |
| 2008/0309500 A1* | 12/2008 | Galos | ................. | G01C 21/3664 340/573.1 |
| 2009/0281727 A1* | 11/2009 | Nagatani | ............ | G01C 21/3688 701/414 |
| 2009/0327977 A1 | 12/2009 | Bachfishcer et al. | | |
| 2011/0029185 A1* | 2/2011 | Aoki | ....................... | B60K 37/06 701/31.4 |
| 2011/0080258 A1* | 4/2011 | Curtis | .................... | B60R 25/00 340/5.72 |
| 2011/0082616 A1* | 4/2011 | Small | ..................... | B60K 35/00 701/31.4 |
| 2011/0164063 A1* | 7/2011 | Shimotani | ............. | G06F 3/0416 345/661 |
| 2013/0176246 A1* | 7/2013 | Kohigashi | ............... | G06F 3/041 345/173 |
| 2014/0152600 A1 | 6/2014 | Lee et al. | | |
| 2015/0094910 A1* | 4/2015 | Bassier | ................. | G06F 3/0416 701/41 |
| 2015/0130759 A1* | 5/2015 | Heo | ...................... | B60K 35/00 345/174 |
| 2015/0268840 A1* | 9/2015 | Leppanen | .............. | B60K 37/06 715/771 |
| 2016/0019767 A1* | 1/2016 | Ebe | ........................ | G08B 21/24 340/425.5 |

FOREIGN PATENT DOCUMENTS

| | | |
|---|---|---|
| CN | 103019524 A | 4/2013 |
| CN | 103853490 A | 6/2014 |
| DE | 102007029618 A1 | 6/2008 |
| DE | 102007029618 A1 | 6/2008 |
| DE | 102008013476 A1 | 9/2009 |
| DE | 102008048825 A9 | 7/2010 |
| DE | 102009023897 A1 | 12/2010 |
| DE | 102009059867 A1 | 6/2011 |
| DE | 102012022312 A1 | 5/2014 |
| DE | 102013007256 A1 | 10/2014 |
| DE | 102013007256 A1 | 10/2014 |
| DE | 102014016222.2 | 10/2014 |
| EP | 1 854 678 A1 | 11/2007 |
| EP | 1 947 636 A1 | 7/2008 |
| EP | 2 787 427 A1 | 10/2014 |
| GB | 2 405 546 A | 3/2005 |
| WO | 2004/081777 A1 | 9/2004 |
| WO | 2010/064387 A1 | 6/2010 |
| WO | PCT/EP2015/002123 | 10/2015 |

OTHER PUBLICATIONS

German OA for German Appln. No. 102014016222.2 dated Oct. 9, 2015.
English translation of International Preliminary Report on Patentability dated May 4, 2017 in corresponding International Patent Application No. PCT/EP2015/002123.
Chinese Office Action for Chinese Application No. 201580058903.8 dated Oct. 24, 2018.

\* cited by examiner

METHOD AND SYSTEM FOR OPERATING A TOUCH-SENSITIVE DISPLAY DEVICE OF A MOTOR VEHICLE

CROSS REFERENCE TO RELATED APPLICATIONS

This application is the U.S. national stage of International Application No. PCT/EP2015/002123, filed Oct. 27, 2015 and claims the benefit thereof. The International Application claims the benefit of German Application No. 102014016222.2 filed on Oct. 31, 2014, both applications are incorporated by reference herein in their entirety.

BACKGROUND

Described below are a method and a system for operating a touch-sensitive display device of a motor vehicle, as well as a motor vehicle with such a system for operating a touch-sensitive display device.

Touch-sensitive display devices, for example in the form of touch screens are increasingly used in motor vehicles. It is customary in this connection for such a touch-sensitive display device to be arranged in the region of a center console or above a center console, wherein a wide variety of functions of the motor vehicle, such as, for example, adjustments to an infotainment system, to a navigation system or the like, can be changed in a touch-controlled manner via the touch-sensitive display device. Display devices of this type are becoming ever larger in terms of their dimensions, and therefore, as a consequence, the ability of a driver and a front-seat passenger to ergonomically reach the entire display device is becoming ever more difficult.

DE 10 2009 059 867 A1 presents a method for operating a touch-sensitive display device of a motor vehicle, wherein it is determined by a proximity detection device whether a vehicle occupant would like to actuate the display device by a touch. In this case, virtual switching surfaces displayed by the display device are displaced on the display device in the direction of the user.

US 2009 03 27 977 A1 likewise presents a method for operating a touch-sensitive display device, wherein it is determined in which region of the display device a touch-controlled user input should be anticipated. As soon as this determination has taken place, corresponding virtual push-buttons displayed by the display device are displaced into this region.

DE 10 2008 048 825 A9 presents a display and operator control system in a motor vehicle with a user-influenceable representation of display objects. The display objects are displaced depending on a detected approach of a hand of a user.

SUMMARY

The method provides requirement-meeting and occupant-oriented operator control of a touch-sensitive display device of a motor vehicle.

The method for operating a touch-sensitive display device of a motor vehicle includes the following:
  detecting whether a driver or a front-seat passenger of the motor vehicle would like to operate the display device;
  if it is detected that only the driver would like to operate the display device: operating the display device in a first operating mode in which a graphic user interface is displayed exclusively in a driver-side display region of the display device;
  if it is detected that only the front-seat passenger of the motor vehicle would like to operate the display device: operating the display device in a second operating mode in which the graphic user interface is displayed exclusively in a front-seat-passenger-side display region of the display device;
  operate the display device: operating the display device in a third operating mode in which the graphic user interface is displayed in the driver-side display region and at least part of the graphic user interface is additionally also displayed in the front-seat-passenger-side display region.

Provision is therefore made in the method to determine whether a driver or a front-seat passenger of the motor vehicle would specifically like to operate the display device. Depending on this information, a driver-side or front-seat-passenger-side orientation of the displayed graphic user interface takes place, and therefore a driver and also a front-seat passenger can operate the touch-sensitive display device particularly simply and ergonomically. An aspect of the method is that in the event both the driver and the front-seat passenger of the motor vehicle would like to operate the display device, the display surface of the display device is divided in such a manner that the graphic user interface is displayed in the driver-side display region and at least part of the graphic user interface is additionally also displayed in the front-seat-passenger-side display region.

In other words, provision is made for the touch-sensitive display device to be operated in this stated case in a split screen mode which corresponds to the third operating mode. Only a reduced menu choice or operator control surface may be provided in the front-seat-passenger-side display region by only part of the graphic user interface additionally also being displayed in the front-seat-passenger-side display region. In particular in the event that both the driver and the front-seat passenger of the motor vehicle would like to operate the touch-sensitive display device, the split screen mode makes it possible for both the driver and the front-seat passenger to be able to reach the touch-sensitive display device and therefore operate same particularly simply and ergonomically.

In an advantageous refinement, the display device is operated in a fourth operating mode in which the graphic user interface is displayed exclusively in a central display region of the display device if it is detected that neither the driver nor the front-seat passenger would like to operate the display device. As a result, both the driver and the front-seat passenger can see the graphic user interface in a particularly simple and clear manner.

According to an alternative advantageous embodiment, the display device is also operated in the first operating mode if it is detected that neither the driver nor the front-seat passenger would like to operate the display device. In this case, the advantage resides in the fact that the driver of the motor vehicle can see the graphic user interface particularly readily, i.e. there is a particularly driver-oriented configuration of the display device. Whether in the case in which neither the driver nor the front-seat passenger would specifically like to operate the display device, the display device is operated in the fourth operating mode or else in the first operating mode, can be customized by a configuration menu. A basic setting can optionally be set in such a manner that either the fourth operating mode or else the first operating mode is set in the case.

In a further advantageous refinement, in the third operating mode, those parts of the graphic user interface by which driver-relevant functions of the motor vehicle can be changed are displayed exclusively in the driver-side display region of the display device. In other words, it can be provided that the driver-relevant contents are not displayed in the front-seat-passenger-side display region in the third operating mode. Driver-relevant functions of the motor vehicle should be understood as meaning all of the functions of the motor vehicle that relate to the driving mode of the motor vehicle. For example, functions of this type can relate to adjustments to driver assistance systems of the motor vehicle, such as, for example, adjustments to an electronic stability system, a speed regulating system or the like. Furthermore, driver-relevant functions of the motor vehicle can also relate, for example, to brightness adjustments to a head-up display, to a combination instrument or the like. Vehicle functions, such as, for example, radio operation, adjustments to an automatic air-conditioning unit, the playback of videos or the like are not considered here to be driver-relevant functions of the motor vehicle and are therefore displayed—depending on which menu structure is specifically in use—in the third operating mode on the front-seat-passenger-side display region. Owing to the fact that those parts of the graphic user interface which can be used to change driver-relevant functions of the motor vehicle are displayed exclusively in the driver-side display region of the display device, cases in which a front-seat passenger could act on such driver-relevant functions of the motor vehicle in a manner changing them are prevented in the third operating mode. This contributes inter alia considerably to increasing the driving safety of the motor vehicle since, by this division in the third operating mode, also highly probably only the driver may undertake changes to driver-relevant functions of the motor vehicle by a corresponding actuation of the graphic user interface.

In a further advantageous refinement, it is determined by a camera system whether the front-seat passenger and/or the driver is closer than a predetermined distance from the display device with at least one finger, and depending thereon, it is detected whether the driver and/or the front-seat passenger would like to operate the display device. In addition, it can also be provided that the touch-sensitive display device itself has a corresponding sensor arrangement—for example in the case of a touch-sensitive display device of capacitive design—by which it can also be determined whether the predetermined distance is fallen short of by a finger of the front-seat passenger and/or of the driver. In cooperation with the camera system it can therefore be determined in a particularly reliable manner whether the front-seat passenger and/or the driver specifically plan to operate the touch-sensitive display device.

A further advantageous embodiment makes provision that it is determined which individuals are in each case sitting on a driver's seat and on a front-seat-passenger's seat and, for the different individuals in each case, a user profile is applied and the operator control actions of the individuals on the display device are detected and, depending thereon, the displayed contents of the graphic user interface are selected specifically for the user profile. In other words, a self-learning system is involved which, on the basis of respective, continuous updated user profiles, identifies respective preferences of different individuals with regard to the graphic user interfaces to be displayed in each case and also only displays elements of the graphic user interface that are customarily operated particularly frequently by the relevant individuals. Personalization is therefore provided, as a result of which different individuals are in each case provided with a display of the contents of the graphic user interface that are coordinated in the best possible way to the individuals, for example using respectively superimposed elements of the graphic user interface.

In a further advantageous embodiment, individuals are identified by the camera system, on the basis of a vehicle key which is used and/or of respective finger print sensors arranged on door handles of a driver's door and front-seat-passenger's door. As a result, it can be determined in a particularly reliable manner which individuals are specifically sitting on the driver's seat or on the front-seat passenger's seat and are carrying out corresponding operator control actions, and therefore the respective user profiles can be filled with data relating to the respective operator control actions in a particularly reliable manner.

According to a further advantageous embodiment, it is provided that if, in the third operating mode, the driver and the front-seat passenger carry out contradictory inputs on the display device, the input of the driver is used. In other words, it is provided that if, in the third operating mode, the driver and the front-seat passenger undertake contradictory inputs on the specifically shown graphic user interface, the input of the driver overrides the input of the front-seat passenger. The inputs of the driver always have precedence over the inputs of the front-seat passenger.

The system for operating a touch-sensitive display device of a motor vehicle has a detection device which is designed to detect whether a driver or a front-seat passenger of the motor vehicle would like to operate the display device, and with a control device which is designed

- to operate the display device in a first operating mode in which a graphic user interface is displayed exclusively in a driver-side display region of the display device if it is detected that only the driver would like to operate the display device;
- to operate the display device in a second operating mode in which the graphic user interface is displayed exclusively in a front-seat-passenger-side display region of the display device if it is detected that only the front-seat passenger would like to operate the display device;
- to operate the display device in a third operating mode in which the graphic user interface is displayed in the driver-side display region and at least part of the graphic user interface is additionally also displayed in the front-seat-passenger-side display region if it is detected that the driver and the front-seat passenger of the motor vehicle would like to operate the display device.

Advantageous refinements of the method should also be considered to be advantageous refinements of the system, wherein the system in particular has means for carrying out the method.

A motor vehicle may include the system described herein for operating a touch-sensitive display device.

BRIEF DESCRIPTION OF THE DRAWINGS

Further advantages, features and details emerge from the description below of exemplary embodiments and with reference to the drawings. The features and combinations of features mentioned in the description and the features and combinations of features mentioned below in the description of the figures and/or shown in the figures alone can be used not only in the respectively stated combination, but also in other combinations or on their own without departing from the scope of the invention.

In the drawings.

DETAILED DESCRIPTION OF THE PREFERRED EMBODIMENT

Reference will now be made in detail to the preferred embodiments, examples of which are illustrated in the accompanying drawings, wherein identical or functionally identical elements are provided with the same reference signs.

Figure 1:
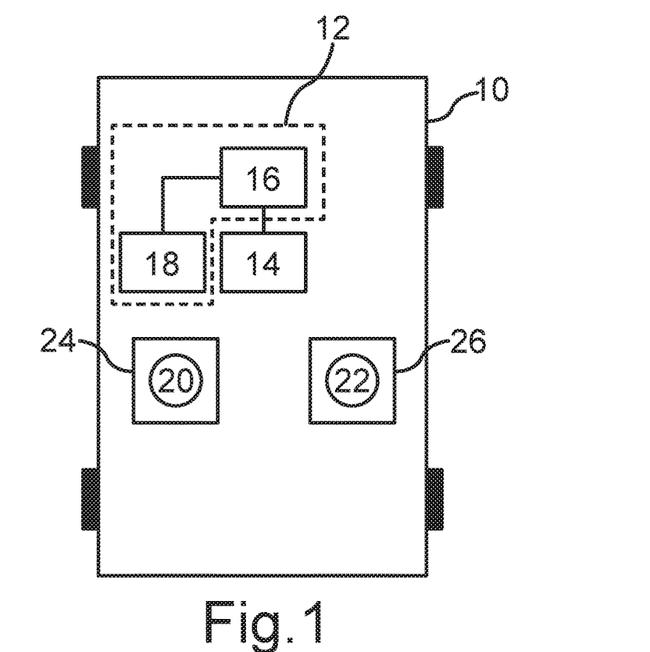
FIG. 1 is a schematic block diagram of a motor vehicle with a system for operating a touch-sensitive display device.

A motor vehicle 10 with a system 12 for operating a touch-sensitive display device 14 of the motor vehicle 10 is shown in a schematic illustration in FIG. 1. The system 12 comprises a control device 16 which is designed to operate the display device 14 in various operating modes. The system 12 furthermore comprises a camera system 18 which is designed to detect whether a driver 20 or a front-seat passenger 22 specifically would like to operate the touch-sensitive display device 14. In addition, the camera system 18 is designed to determine which individual is in each case sitting on a driver's seat 24 and on a front-seat passenger's seat 26 and for transmitting this information to the control device 16. The control device 16 is in turn designed to apply a user profile for the different individuals in each case and to detect and store their operator control actions on the touch-sensitive display device 14 and, depending on the operator control actions, to select in a manner specific to the user profile the displayed contents of a graphic user interface, the contents being displayed by the display device 14.

The system 12 can furthermore also have respective finger print sensors (not illustrated here) which are arranged on door handles of a driver's door and front-seat-passenger's door, by which an individual can likewise be identified. Furthermore, the system 12 can also be designed to carry out the identification of an individual—at least with respect to a driver—on the basis of a respectively used vehicle key by which the motor vehicle 10 has been unlocked.

Figure 2:
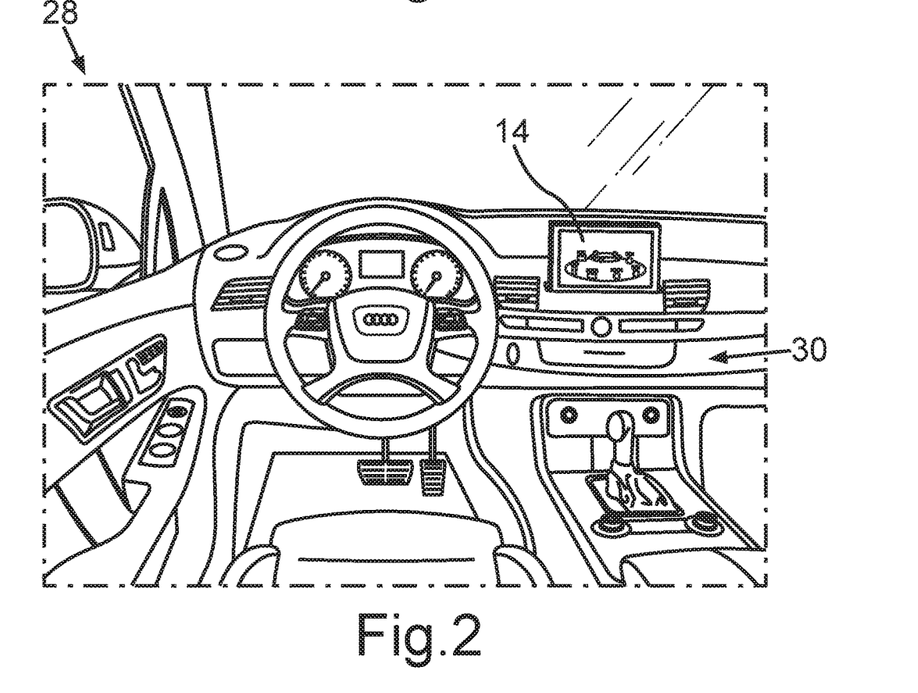
FIG. 2 is a perspective view of a partially illustrated cockpit of the motor vehicle, with the touch-sensitive display device arranged as a central display above a center console of the cockpit.

FIG. 2 partially illustrates a cockpit 28 of the motor vehicle 10. The touch-sensitive display device 14 is arranged above a center console 30 of the cockpit and therefore acts as a central display. It is possible in a touch-controlled manner via the touch-sensitive display device 14 to activate and change a very wide variety of functions of the motor vehicle 10, such as, for example, a very wide variety of infotainment functions, but also adjustments to driver assistance systems and the like. A method for operating the touch-sensitive display device 14 is explained in more detail below with reference to FIGS. 3 to 6.

Figure 3:
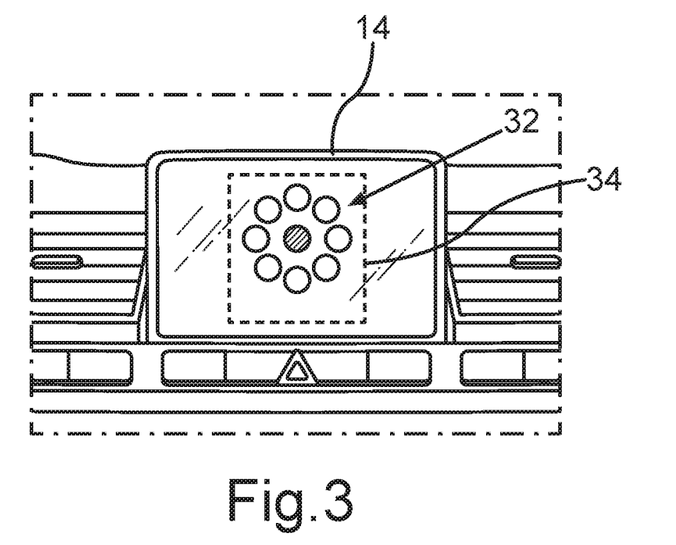
FIG. 3 is a schematic illustration of the touch-sensitive display device displaying a graphic user interface in a central display region of the display device.

FIG. 3 shows the touch-sensitive display device 14, wherein the latter is operated in such an operating mode that a graphic user interface 32 is displayed exclusively in a central display region 34 of the display device 14. This always takes place in the cases in which it is detected that neither the driver 20 nor the front-seat passenger 22 would specifically like to operate the display device 14. In order to detect whether the front-seat passenger 20 or the front-seat passenger 22 specifically would like to operate the display device 14, it is determined by the camera system 18 whether the front-seat passenger 20 and/or the front-seat passenger 22 specifically is closer with at least one finger than a predetermined distance, for example of 5 cm, 10 cm or 20 cm, from the display device 14, wherein it is detected, depending thereon, whether the driver 20 and/or the front-seat passenger 22 would like immediately to operate the display device 14. In the event that the touch-sensitive display device 14 is a capacitive display device, a sensor arrangement correspondingly provided thereon can additionally also determine whether the predetermined distance from the display device 14 has been correspondingly breached.

Figure 4:
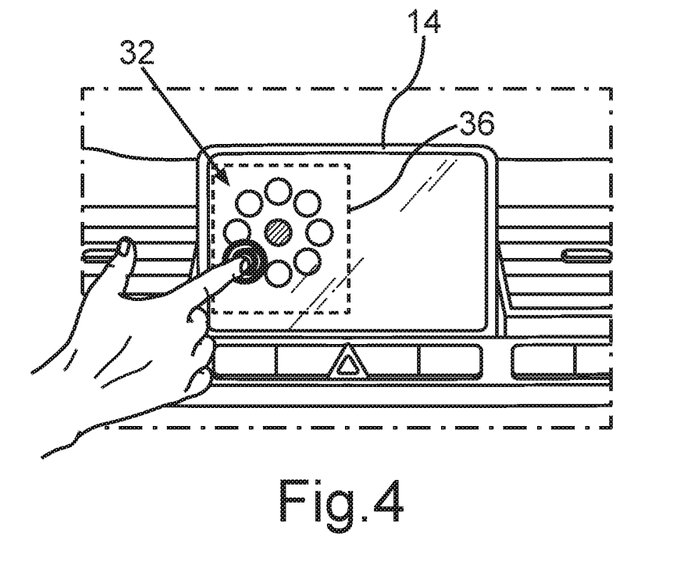
FIG. 4 is a schematic illustration of the touch-sensitive display device displaying the graphic user interface in a driver-side display region of the display device.

FIG. 4 shows the case in which it has been detected that only the driver 20 would like to operate the display device 14. In this case, the display device 14 is operated by the control device 16 in a first operating mode in which the graphic user interface 32 is displayed exclusively in a driver-side display region 36 of the display device 14. In other words, the graphic user interface 32 is therefore displaced in the direction of the driver 20 and displayed such that the driver 20 can actuate the corresponding operator control elements of the graphic user interface 32 in a particularly simple manner, in particular without leaving his customary driving position.

In contrast to the operating mode described in conjunction with FIG. 3, it can also be provided that the display device 14 is likewise operated in this first operating mode, i.e. in the operating mode shown in FIG. 4, if it is detected that neither the driver 20 nor the front-seat passenger 22 would like to operate the display device 14. In other words, it can therefore be provided that, in the event that neither the driver 20 nor the front-seat passenger 22 has specifically approached the display device 14, a driver-oriented display of the graphic user interface 32 always takes place by the latter being displayed in the driver-side display region 36.

FIG. 5 again shows the display device 14. In the present case, it has been detected that only the front-seat passenger 22 would specifically like to operate the display device 14. In this case, the control device 16 operates the display device 14 in a second operating mode in which the graphic user interface 32 is displayed exclusively in a front-seat-passenger-side display region 38 of the display device 14. In other words, for the case in which only the front-seat passenger 22 would like to operate the display device 14, the graphic user interface 32 specifically retrieved is displaced in the direction of the front-seat passenger 22 such that he can reach the operator control elements of the graphic user interface 32 in a particularly simple manner, in particular without having to noticeably change his position in the front-seat-passenger seat 26.

FIG. 6 again illustrates the display device 14. In the present case, it is has been detected by the camera system 18 that both the driver 20 and the front-seat passenger 22 would like to operate the display device 14. The control device 16 operates the display device 14 in a third operating mode in which the graphic user interface 32 is displayed in the driver-side display region 36 and at least part of the graphic user interface 32 is additionally also displayed in the front-seat-passenger-side display region 38.

Figure 6:
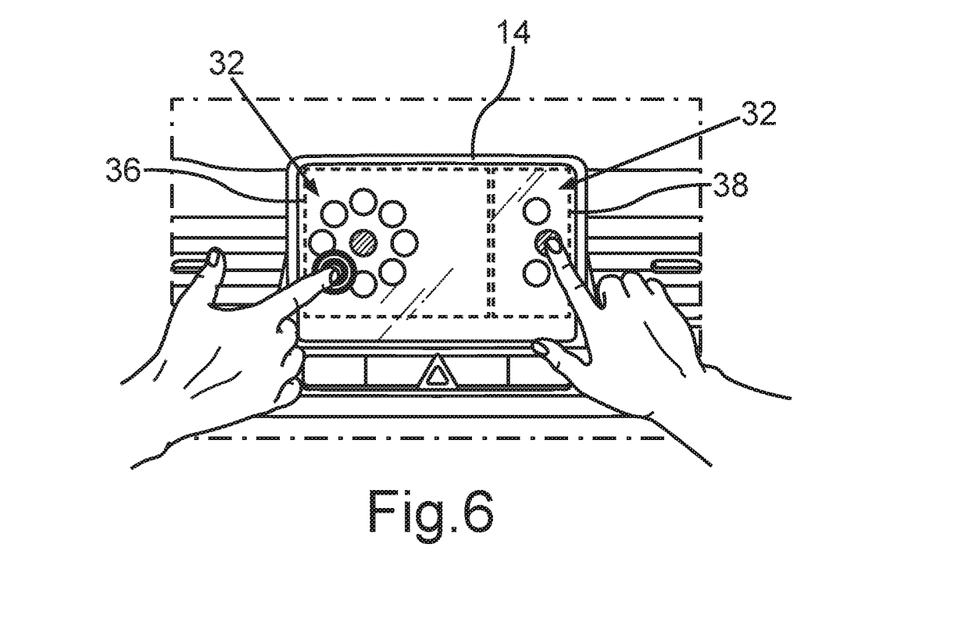
FIG. 6 is the touch-sensitive display device displaying the graphic user interface in the driver-side display region and part of the graphic user interface additionally also in the front-seat-passenger-side display region.

In the third operating mode, those parts of the graphic user interface by which driver-relevant functions of the motor vehicle can be changed may be displayed exclusively in the driver-side display region 36. In other words, those parts or elements of the graphic user interface 32 by which driver-relevant functions of the motor vehicle 10 can be changed are not displayed in the front-seat-passenger-side display region 38. For example, menu elements of the graphic user interface 32, by which brightness of a head-up display, of a combination instrument or the like can be adjusted, are not displayed in the front-seat-passenger-side display region 38. Furthermore, operator control elements of the graphic user interface 32 by which a very wide variety of driver assistance systems, such as, for example, a cruise control, and a very wide variety of adjustment options to an electronic driving stability system and the like can be adjusted are not displayed in the front-seat-passenger-side display region 38 either. For the case in which it has been detected that both the driver 20 and the front-seat passenger 22 would like to operate the display device 14, only those elements of the graphic user interface 32 by which no driver-relevant functions of the motor vehicle 10 can be changed are displayed in the front-seat-passenger-side display region 38.

If, in addition, in the third operating mode, the driver 20 and the front-seat passenger 22 attempt to carry out contradictory inputs on the display device 14, i.e. more precisely on the graphic user interface 32, the input of the driver 20 is used. In other words, the input of the driver 20 always overrides the input of the front-seat passenger 22, at least as long as the display device 14—as shown in FIG. 6—is operated in the third operating mode, i.e. in the manner of a split screen mode.

Figure 5:
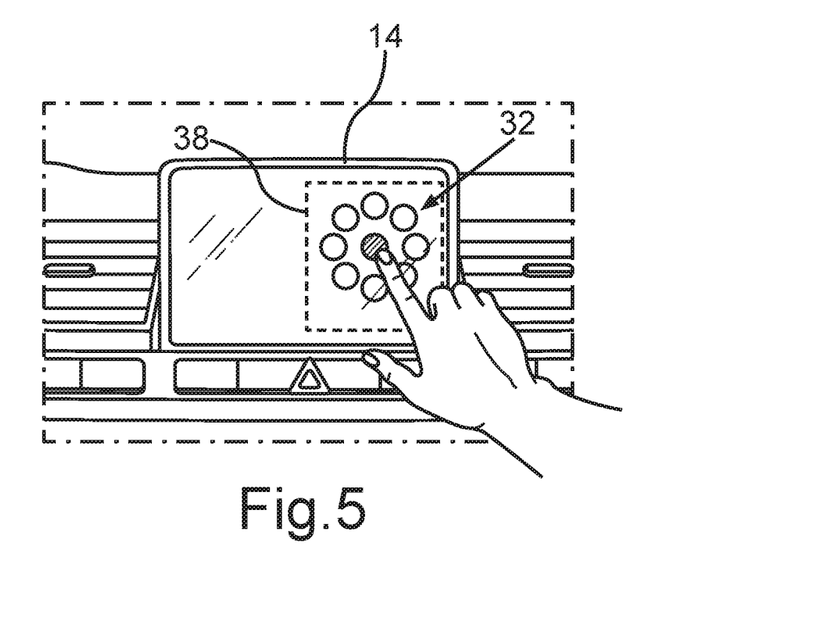
FIG. 5 is a schematic illustration of the display device displaying the graphic user interface in a front-seat-passenger-side display region of the display device.

In FIG. 5 and FIG. 6, the driver-side display region 36 and the front-seat-passenger-side display region 38 are illustrated in differing sizes. This does not inevitably have to be the case. It can also be provided that, in the third operating mode, the driver-side display region 36 and the front-seat-passenger-side display region 38 are selected to be identical in size. The sizes of the driver-side display region 36 and of the front-seat-passenger-side display region 38 may be dimensioned depending on how many elements of the graphic user interface 32 are specifically intended to be displayed in the respective display regions 36, 38.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a touch-sensitive display device of a motor vehicle, comprising:
    detecting which of a driver and a front-seat passenger of the motor vehicle would like to operate the touch-sensitive display device having a single display with a driver-side display region on a first portion of the single display closest to the driver and a passenger-side display region on a remaining portion of the single display closest to the front-seat passenger;
    operating the touch-sensitive display device in a first operating mode in which a graphic user interface is displayed exclusively in the driver-side display region of the touch-sensitive display device, when said detecting detects that only the driver would like to operate the touch-sensitive display device;
    operating the touch-sensitive display device in a second operating mode in which the graphic user interface is displayed exclusively in the passenger-side display region of the touch-sensitive display device, when said detecting detects that only the front-seat passenger would like to operate the touch-sensitive display device;
    operating the touch-sensitive display device in a third operating mode in which the graphic user interface is displayed in the driver-side display region and at least part of the graphic user interface is also displayed in the front-seat-passenger-side display region, when said detecting detects that both the driver and the front-seat passenger of the motor vehicle would like to operate the touch-sensitive display device; and
    operating the touch-sensitive display device in a fourth operating mode in which the graphic user interface is displayed exclusively in one of the driver-side display region and a central display region, formed of less than all of the touch-sensitive display device, substantially equidistant between the driver- and the front-seat passenger, when said detecting detects that neither the driver nor the front-seat passenger would like to operate the touch-sensitive display device.

2. The method as claimed in claim 1, wherein in the fourth operating mode the graphic user interface is displayed exclusively in the central display region of the touch-sensitive display device.

3. The method as claimed in claim 1, wherein in the fourth operating mode the graphic user interface is displayed exclusively in the driver-side display region of the touch-sensitive display device.

4. The method as claimed in claim 1, wherein, in the third operating mode, the graphic user interface displays driver-relevant functions of the motor vehicle exclusively in the driver-side display region of the touch-sensitive display device.

5. The method as claimed in claim 1, wherein said detecting detects, via a camera system, whether at least one finger of at least one of the front-seat passenger and the driver is within a predetermined distance of the touch-sensitive display device in determining whether at least one of the driver and the front-seat passenger would like to operate the touch-sensitive display device.

6. The method as claimed in claim 1, further comprising
    determining which individuals are in each case sitting on a driver's seat and on a front-seat-passenger's seat;
    applying, for each of the individuals, a user profile;
    detecting operator control actions of the individuals on the touch-sensitive display device; and
    selecting displayed contents of the graphic user interface specifically for the user profile of each of the individuals, depending on the operator control actions.

7. The method as claimed in claim 6, wherein said determining comprises identifying the individuals by at least one of a camera system, a vehicle key operating the motor vehicle, and respective finger print sensors arranged on door handles of a driver's door and front-seat-passenger's door.

8. The method as claimed in claim 1, wherein said operating in the third operating mode is based on input of the driver when the front-seat passenger sup-plies contradictory input on the touch-sensitive display device.

9. A system for operating a touch-sensitive display device of a motor vehicle, the touch-sensitive display device having a single display with a driver-side display region on a first portion of the single display closest to a driver-side of the motor vehicle and a passenger-side display region on a remaining portion of the single display closest to a front-seat-passenger-side of the motor vehicle, comprising:
- a detection device detecting which of a driver and a front-seat passenger of the motor vehicle would like to operate the touch-sensitive display device; and
- a control device
    - operating the touch-sensitive display device in a first operating mode in which a graphic user interface is displayed exclusively in the driver-side display region of the touch-sensitive display device when only the driver would like to operate the touch-sensitive display device;
    - operating the touch-sensitive display device in a second operating mode in which the graphic user interface is displayed exclusively in the front-seat-passenger-side display region of the touch-sensitive display device when only the front-seat passenger would like to operate the touch-sensitive display device;
    - operating the touch-sensitive display device in a third operating mode in which the graphic user interface is displayed in the driver-side display region and at least part of the graphic user interface is also displayed in the front-seat-passenger-side display region, when both the driver and the front-seat passenger of the motor vehicle would like to operate the touch-sensitive display device; and
    - operating the touch-sensitive display device in a fourth operating mode in which the graphic user interface is displayed exclusively in one of the driver-side display region and a central display region, formed of less than all of the touch-sensitive display device, substantially equidistant between the driver- and the front-seat passenger, when neither the driver nor the front-seat passenger would like to operate the touch-sensitive display device.

10. The system as claimed in claim 9, wherein said control device operates in the fourth operating mode in which the graphic user interface is displayed exclusively in the central display region, when neither the driver nor the front-seat passenger would like to operate the touch-sensitive display device.

11. The system as claimed in claim 9, wherein said control device operates in the fourth operating mode, displaying the graphic user interface exclusively in the driver-side display region of the touch-sensitive display device, when said neither the driver nor the front-seat passenger would like to operate the touch-sensitive display device.

12. The system as claimed in claim 9, wherein when said control device operates in the third operating mode, the graphic user interface displays driver-relevant functions of the motor vehicle exclusively in the driver-side display region of the touch-sensitive display device.

13. The system as claimed in claim 9, wherein said detection device includes a camera system, and detects whether at least one finger of at least one of the front-seat passenger and the driver is within a predetermined distance of the touch-sensitive display device in determining whether at least one of the driver and the front-seat passenger would like to operate the touch-sensitive display device.

14. The system as claimed in claim 9, wherein the motor vehicle further includes a driver-side door and front-passenger-side door,
- wherein the system for operating the touch-sensitive display device further comprises an individual detection system including at least one of
    - a camera system;
    - a vehicle key operating the motor vehicle; and
    - finger print sensors arranged on door handles of the driver-side door and front-passenger-side door, and
- wherein said control device further
    - determines which individuals are in each case sitting on a driver's seat and on a front-seat-passenger's seat based on output from the individual detection system;
    - applies a user profile corresponding to each of the individuals;
    - detects operator control actions of the individuals on the touch-sensitive display device; and
    - selects displayed contents of the graphic user interface based on the user profile of each of the individuals and the operator control actions.

15. A motor vehicle, comprising:
- a touch-sensitive display device having a single display with a driver-side display region on a first portion of the single display closest to a driver of the motor vehicle and a passenger-side display region on a remaining portion of the single display closest to a front-seat passenger of the motor vehicle;
- a detection device detecting which of the driver and the front-seat passenger of the motor vehicle would like to operate the touch-sensitive display device; and
- a control device
    - operating the touch-sensitive display device in a first operating mode in which a graphic user interface is displayed exclusively in the driver-side display region of the touch-sensitive display device when only the driver would like to operate the touch-sensitive display device;
    - operating the touch-sensitive display device in a second operating mode in which the graphic user interface is displayed exclusively in the passenger-side display region of the touch-sensitive display device when only the front-seat passenger would like to operate the touch-sensitive display device;
    - operating the touch-sensitive display device in a third operating mode in which the graphic user interface is displayed in the driver-side display region and at least part of the graphic user interface is also displayed in the passenger-side display region, when both the driver and the front-seat passenger of the motor vehicle would like to operate the touch-sensitive display device; and
    - operating the touch-sensitive display device in a fourth operating mode in which the graphic user interface is displayed exclusively in one of the driver-side display region and a central display region, formed of less than all of the touch-sensitive display device, substantially equidistant between the driver- and the front-seat passenger, when said detecting detects that neither the driver nor the front-seat passenger would like to operate the touch-sensitive display device.

16. The motor vehicle as claimed in claim 15, wherein in the fourth operating mode the graphic user interface is displayed exclusively in the central display region of the touch-sensitive display device.

17. The motor vehicle as claimed in claim 15, wherein in the fourth operating mode the graphic user interface is displayed exclusively in the driver-side display region of the touch-sensitive display device.

18. The motor vehicle as claimed in claim 15, wherein when said control device operates in the third operating mode, the graphic user interface displays driver-relevant functions of the motor vehicle exclusively in the driver-side display region of the touch-sensitive display device.

19. The motor vehicle as claimed in claim 15, wherein said detection device includes a camera system, and detects whether at least one finger of at least one of the front-seat passenger and the driver is within a predetermined distance of the touch-sensitive display device in determining whether at least one of the driver and the front-seat passenger would like to operate the touch-sensitive display device.

20. The motor vehicle as claimed in claim 15, further comprising:
- a driver-side door and front-passenger-side door,
- an individual detection system including at least one of
  - a camera system;
  - a vehicle key operating the motor vehicle; and
  - finger print sensors arranged on door handles of the driver-side door and front-passenger-side door, and wherein said control device further
- determines which individuals are in each case sitting on a driver's seat and on a front-seat-passenger's seat based on output from the individual detection system;
- applies a user profile corresponding to each of the individuals;
- detects operator control actions of the individuals on the display device; and
- selects displayed contents of the graphic user interface based on the user profile of each of the individuals and the operator control actions.

21. The motor vehicle as claimed in claim 15, wherein the driver-side display region and the passenger-side display region of the touch-sensitive display device are dimensioned depending on a number of elements of the graphic user interface displayed in each display region.

* * * * *

UNITED STATES PATENT AND TRADEMARK OFFICE
CERTIFICATE OF CORRECTION

PATENT NO. : 10,410,319 B2
APPLICATION NO. : 15/523376
DATED : September 10, 2019
INVENTOR(S) : Matthias Wunderlich et al.

Page 1 of 1

It is certified that error appears in the above-identified patent and that said Letters Patent is hereby corrected as shown below:

In the Claims

Column 8, Line 63, In Claim 8, delete "sup-plies" and insert -- supplies --, therefor.

Signed and Sealed this
Twelfth Day of November, 2019

Andrei Iancu
*Director of the United States Patent and Trademark Office*